Oct. 4, 1955  M. KARNAUGH  2,719,962

ELECTRICAL CIRCUIT EMPLOYING MAGNETIC CORES

Filed April 27, 1954

INVENTOR
M. KARNAUGH
BY James W. Falk
ATTORNEY

United States Patent Office 2,719,962

Patented Oct. 4, 1955

2,719,962

ELECTRICAL CIRCUIT EMPLOYING MAGNETIC CORES

Maurice Karnaugh, New Providence, N. J., assignor to Bell Telephone Laboratories, Incorporated, New York, N. Y., a corporation of New York Application April 27, 1954, Serial No. 425,846

9 Claims. (Cl. 340—166)

Figures 1, 2, 3:
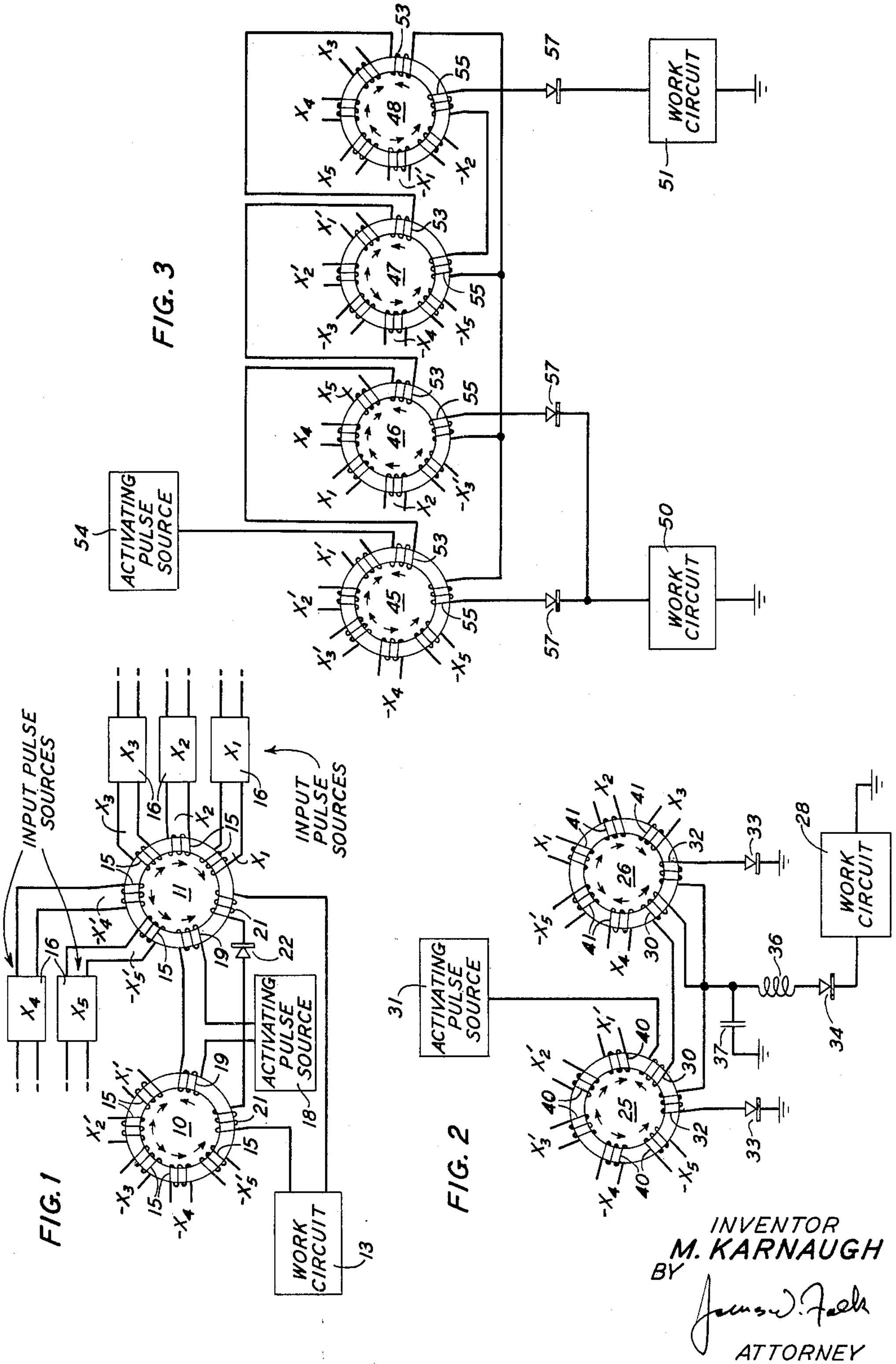

This invention relates to electrical circuits and more particularly to such circuits employing magnetic cores.

Magnetic cores may readily be employed in digital information handling circuits to attain desired mathematic or logic functions. Such cores are generally of a ferromagnetic toroid, as of thin metallic tape or ferrite material, and have nearly rectangular hysteresis loops; a plurality of windings are positioned on the toroid. Materials having the desired hysteresis characteristic are known in the art and include certain ferrites, such as the General Ceramics $S_1$, $S_2$, $S_3$ Ferramic materials, Deltamax, a grain oriented 50% nickel iron alloy of the Allegheny Ludlum Steel Company, 4–79 molydenum permalloy, supermalloy, and other materials.

The core has two stable states of maximum remanent magnetization at zero applied field; one of these is referred to as the set state and the other the normal state of magnetization. A core will switch from one of these states to the other when a pulse of current passes through an input winding in the appropriate direction. The resulting change in flux on change of magnetic state of the material causes a voltage to be induced across an output winding and thereby an indication of the prior condition of the core can be obtained.

Logic functions can be attained by combinations of inputs and outputs of these cores using an activating winding on each core to reset cores that had been set by the inputs to the cores and thereby produce an indication on the output winding of the prior condition of the core. To attain a maximum degree of circuit flexibility it is desirable to be able to capitalize on the possibilities of both the core input and core output circuits. Prior circuits in which the output windings have been connected to attain various logic functions are disclosed in application Serial No. 425,875, filed April 27, 1954, of F. T. Andrews, Jr., and in my applications Serial No. 393,399, filed November 20, 1953, and Serial Nos. 425,845 and 425,847, filed April 27, 1954.

It is a general object of this invention to increase the utility of magnetic core circuits by employing to greater advantage the input windings of the cores.

It is an object of this invention to provide improved magnetic core circuits in which the logic functions are attained primarily through combinations of input pulses and the setting functions of the cores rather than primarily through combinations of output windings or networks.

Before further discussing the various aspects of this invention, it is desirable to define certain terms and conventions. The inputs to the circuit will be denoted by the variables $x_i$ and their negations $x'_i$. Each variable or primed variable has one of the two possible values "0" or "1" and a variable and its negation always have complementary or "opposite" values. We shall further define the term $x^*_i$ to mean either $x_i$ or $x'_i$ without caring to specify one or the other. The negation of a variable is as important as the variable itself, and either one may be employed as an input. Accordingly, it will be convenient to speak of the variables $x^*_i$ and $(x^*_i)'$ without the need to specify which of the two corresponds to $x_i$ and which to $x'_i$.

Corresponding to a given input variable, $x^*_i$ will be an input lead, also denoted by $x^*_i$. This lead will conduct an input pulse during the input phase of the circuit's operating cycle whenever $x^*_i$ equals "1," but will conduct no input pulse when $x^*_i$ equals "0." Each such input lead will be connected to an input winding on a core. If it is so connected that a pulse applied to the input lead will tend to set the core, then the winding will be said to be positively connected. If the input lead is connected to the winding in the opposite sense, so that a pulse on the lead will tend to oppose setting the core, then the winding will be said to be negatively connected.

A winding of N turns which is positively connected to input lead $x^*_i$ will be denoted algebraically by $Nx^*_i$. If it is negatively connected to the input lead $x^*_i$, then the winding will be denoted by $-Nx^*_i$.

In accordance with an aspect of this invention, one or more magnetic cores are included in a circuit each having a plurality of input windings thereon to which input pulses are applied simultaneously in accordance with the input variables. Some of these pulses serve to set the core and some to maintain the core in its normal state. The core will therefore only be set if the input pulses applied to the windings are such that there is a preponderance of at least one winding tending to set the core.

The state of a core at the end of the input phase will be a function of the values of its input variables. We define a setting function $s(x^*_i)$ to have the value "1" if the core is set, and the value "0" if it remains in its normal state. Further, we define the particular setting function $$s(x^*_i)=(k|x^*_1, x^*_2, \ldots x^*_n) \quad (1)$$

to be that function which has the value "1" if and only if $k$ or more of the $n$ variables $x^*_i$ have the value "1." If $k$ equals one, then this describes an "or" circuit. We shall not be concerned with this special case in the discussion of this invention.

To attain the setting function of Equation 1 we may include $n+1$ input windings on the core, algebraically denoted by the summation $$Nx^*_1+Nx^*_2+ \ldots +Nx^*_n-N(k-1) \quad (2)$$

The last of these windings which has $N(k-1)$ turns is negatively connected to an input lead which conducts a pulse during each input phase and whose associated input variable is always equal to unity. By making use of the fact that $x^*_i+(x^*_i)'=1$, whence $$x^*_i=1-(x^*_i)' \quad (3)$$

we can transform this expression to one which denotes a more economic set of input windings. Specifically, Expression 2 can be transformed to $$Nx^*_1+Nx^*_2+ \ldots +Nx^*_{n-k+1} -N(x^*_{n-k+2})' \ldots -N(x^*_n)' \quad (4)$$

which makes unnecessary the extra input winding just described. This may be stated by saying that for $n$ input windings, $(n-k+1)$ of the input windings are utilized to generate flux tending to set the core and $(k-1)$ of the input windings are utilized to generate flux tending to oppose setting of the core on simultaneous application of the input pulses to the core. Expressions of the form (2) and (4) shall be referred to as input composites.

Circuits in accordance with this invention thus utilize a balance between opposed windings on a single core when these windings have simultaneous input pulses applied thereto. It should be pointed out that the type of output winding circuitry utilized is not critical and that various types of output winding configurations known in the art may be employed.

One circuit problem that readily lends itself to solution by novel circuits in accordance with this invention is the checking or monitoring of coded information to determine either that a given information message is implausible or is plausible. By plausibility is meant that the number of information bits in a given message is equal to or in another given relationship to a previously specified number or numbers of bits. Specifically, as is known, the number of information bits $n_1$ in a given message may be plausible if in relationship to a previously specified number $k$, $k_1$ or $k_2$ as given by the following table:

$$n_1=k$$
$$n_1\geqq k$$
$$n_1\leqq k$$
$$k_1\leqq n_1\leqq k_2$$

Thus in an error detecting circuit employed with a two-out-of-five code, any information message containing more or less than two variables equal to "1," out of a total of five variables, $x_1$, $x_2$, $x_3$, $x_4$, $x_5$, is implausible and erroneous.

In one specific illustrative embodiment of this invention a pair of magnetic cores are employed in an error detecting circuit for a two-out-of-five code, one core having an input setting function such that it is set when less than two "1's" appear in the message being checked and the other core having a setting function such that it is set when more than two "1's" appear in the message being checked, regardless of the particular variables having the value "1" in the message. The output circuit is arranged so that an output pulse is applied to a work circuit whenever either core has priorly been set.

In another specific illustrative embodiment of this invention a pair of magnetic cores are employed in a checking circuit for a two-out-of-five code wherein an output is applied to a work circuit if and only if the message contains two information bits. In this specific embodiment of the invention a shunt type output circuit is employed which applies an ouput pulse to the work circuit if and only if both cores have been set, one of the cores being set only if two or less of the information bits of the message are equal to "1" and the other core being set if and only if two or more of the information bits are equal to "1." Thus both cores are set when exactly two information bits are equal to "1."

In still another specific illustrative embodiment of this invention employing four magnetic cores and a different output circuit configuration, outputs are applied to one work circuit for an implausible message and to another work circuit for a plausible message.

It is accordingly another object of this invention to provide improved checking circuits for coded information messages.

It is a further object of this invention to provide improved checking circuits, utilizing magnetic cores and more particularly utilizing the setting functions and input windings of such cores.

It is another object of this invention to provide improved circuits for checking two-out-of-five codes.

It is a feature of this invention that a magnetic core have a plurality of windings thereon to which input pulses are simultaneously applied, the number of turns of these windings and the current amplitude and duration of the input pulses being such that the magnetic core is set if and only if, for the particular input pulses applied to the windings of the core, there is a preponderance of at least one winding tending to set the core.

It is another feature of this invention that a magnetic core have $n$ input windings thereon to which $n$ input pulses may be simultaneously applied through input leads corresponding to input variables or their negations, $(n-k+1)$ of the input windings being utilized to set the core and $(k-1)$ of the input windings being utilized to oppose setting of the core, $k$ being an integer greater than 1 and less than or equal to $n$.

It is still a further feature of this invention that a pair of such cores be connected in an electrical circuit wherein the number of input windings on each core is the same but the setting functions, determined by the manner of connecting the input windings to input leads of the two cores are different.

Further it is a feature of this invention that a pair of such cores be employed in a checking circuit for coded information messages, the setting functions of the two cores being such that an output is received only on the occurrence of either a plausible coded message or an implausible coded message.

A complete understanding of the invention and of these and other features thereof may be gained from consideration of the following detailed description and the accompanying drawing, the three figures of which are three specific embodiments of checking circuits in accordance with aspects of the invention for checking two-out-of-five information messages.

Turning now to Fig. 1 the specific embodiment there depicted comprises a pair of cores 10 and 11 whose setting functions are determined in accordance with this invention so than an output pulse is subsequently delivered to a work circuit 13 whenever an implausible coded message is checked. As a two-out-of-five code is being checked each core has five input windings 15 thereon, the windings being connected to input pulse sources 16 which generate the pulses of the coded message being checked. In an information handling system the input pulse sources would comprise a means for deriving the coded information from the system as it is transmitted from one point in the system to a subsequent point in the system.

Each pulse source 16 generates a pulse in each coded message, a pulse being generated both when the variable or information bit in the message is "1" or present and when it is "0" or absent. In the drawing, outputs are available at both the right and left sides of the pulse sources 16, a pulse appearing at the left hand output when the input variable is "1," and appearing at the right hand output when the input variable is "0," in which case the primed variable is "1."

An activating pulse is applied from an activating pulse source 18 to series connected activating windings 19 on the cores 10 and 11. An activating pulse is delivered to these windings in alternate phase with the pulses from the input sources 16. An output winding 21 is wound on each core, the windings 21 being connected in series through a diode 22 and to the work circuit 13. An output is delivered to the work circuit 13 during application of the activating pulse whenever either of the cores 10 or 11 has priorly been set.

The setting functions of cores 10 and 11 are determined, in accordance with this invention, by the requirement that core 10 be set whenever less than two of the input variables of the coded information message are "1" and that core 11 be set whenever more than two of the input variables of the coded message are "1." Thus an error pulse is delivered to the work circuit 13 in all instances except when the coded message contains two-out-of-five bits equal to "1" and is thus plausible.

For core 10, therefore, the setting requirement is that less than two of the inputs be equal to "1"; this is equivalent to four or more of the primed variables being equal to "1," or $$s(\text{core } \mathbf{10})=(4|x'_1,\ x'_2,\ x'_3,\ x'_4,\ x'_5) \qquad (5)$$

We can substitute directly into Formula 4 to determine the actual input windings and inputs thereto from Equation 4, taking $n=5$, $k=4$, and $x^*_i=x'_i$, giving $$Nx'_1+Nx'_2-Nx_3-Nx_4-Nx_5 \qquad (6)$$

as the statement of the input composite for the setting function of core 10. This means that two primed variable input leads are applied to two windings in a direction to set the core when those primed variables are "1," (i. e., the corresponding variables are "0" and no information bits are present in those positions in the coded information message), and three leads corresponding to unprimed variables are applied to three windings in a direction to oppose setting the core when those input variables are equal to "1" (i. e., when information bits are present in the coded information message in those positions).

The variable or primed variable corresponding to the appropriate input lead and whether a pulse in that lead tends to magnetize the core to set the core or oppose setting the core are indicated by the symbol adjacent each winding in the drawing, it being remembered that an unprimed variable indicates a pulse is applied when the variable is equal to "1" in the message, a primed variable indicates a pulse is applied when the corresponding unprimed variable is equal to "0," a positive value indicates that it acts to set the core, and a negative value indicates that it tends to oppose setting the core. In Fig. 1, and subsequent figures, the normal or initial state of the magnetic core, to which the core is always switched by the activating pulse, is assumed to be counterclockwise, and arrows are placed next to each input winding showing the direction of magnetomotive force due to the pulse flowing through that winding.

For core 11 the setting requirement is that three or more of the input variables be "1"; therefore the setting function is $$s(\text{core } \mathbf{11})=(3|x_1,\ x_2,\ x_3,\ x_4,\ x_5) \qquad (7)$$

and, using Formula 4, we get $$Nx_1+Nx_2+Nx_3-Nx'_4-Nx'_5 \qquad (8)$$

as the input composite of the core. As the setting function is symmetric, the input composite may be transformed by changing subscripts on the variables; accordingly the operation of the circuit of Fig. 1 in accordance with this invention is not changed by any permutation of the subscripts on the variables. The input composite for each core will still comply with the desired setting function for that individual core.

In Fig. 2 is depicted another specific illustrative embodiment of this invention wherein a circuit for checking two-out-of-five coded messages provides a correct code pulse to the work circuit 28 only when two-out-of-five of the information bits are present in the coded message and therefore two-out-of-five input variables are equal to "1." In the embodiment of Fig. 2 a shunt type output circuit is utilized, as more fully described in application Serial No. 425,875, filed April 27, 1954, of F. T. Andrews, Jr. In this output circuit the activating windings 30 are connected in series with the activating pulse source 31 and with an output network comprising the output windings 32 in parallel and shunting the work circuit 28. A diode 33 is in series with each of the output windings 32 and a diode 34 is in series with the work circuit 28. A single stage low pass filter, comprising the inductance 36 and capacitance 37, may advantageously be included in the output path to improve the wave shape of the output pulse.

The input windings 40 on core 25 and the pulses applied thereto are arranged to provide a setting function such that the core is set wherever two or less of the unprimed variables are equal to "1." This is equivalent, however, to three or more of the primed variables being equal to "1." Therefore the setting function is given by the expression $$s(\text{core } \mathbf{25})=(3|x'_1,\ x'_2,\ x'_3,\ x'_4,\ x'_5) \qquad (9)$$

and Formula 4 gives the input composite of the setting function $$Nx'_1+Nx'_2+Nx'_3-Nx'_4-Nx_5 \qquad (10)$$

where $n=5$, $k=3$ and $x^*_i=x'_i$.

For core 26 the input windings 41 are connected to input leads so that the core is set wherever two or more of the information bits of the coded message are equal to "1"; therefore the setting function is $$s(\text{core } \mathbf{26})=(2|x_1,\ x_2,\ x_3,\ x_4,\ x_5) \qquad (11)$$

from which the input composite of the setting function is $$Nx_1+Nx_2+Nx_3+Nx_4-Nx'_5 \qquad (12)$$

In the drawing the setting characteristic of each winding 40 and 41 is indicated by the variable adjacent thereto and the arrow also adjacent thereto.

In a shunt type output circuit an output pulse is only applied to the work circuit when all possible parallel paths through the output windings have been blocked; in this instance therefore an output pulse is applied to work circuit 28 only when blocking electromotive forces are developed across both output windings 32 on application of the activating pulse to the series connected activating windings. This will occur when both cores have been priorly set which in turn can only occur, in accordance with the chosen setting functions, when two and only two of the five information bits are present in a coded message.

In the embodiment of this invention depicted in Fig. 3 there are four cores 45, 46, 47 and 48. An output is applied to one work circuit 50 when the information message is implausible and to another work circuit 51 when the information message is plausible. Activating windings 53 on each core are connected in series to an activating pulse source 54 and output windings 55. The output circuitry is of the type disclosed in my application Serial No. 393,399, filed November 20, 1953, in which an output pulse passes through the output windings of the priorly unset cores.

In this embodiment the output windings 55 of the cores 45 and 46 are connected in parallel and to the work circuit 50 and the output windings 55 of cores 47 and 48 connected in series to the work circuit 51, diodes 57 being connected in each output path to a work circuit.

Core 45 is to be set if two or less information bits are present in the coded message being checked and core 46 is to be set if two or more information bits are present; accordingly an output pulse is applied to circuit 50 except when exactly two of the five information bits are present in the coded message and the message is plausible. Therefore, $$s(\text{core } \mathbf{45})=3|x'_1,\ x'_2,\ x'_3,\ x'_4,\ x'_5) \qquad (13)$$

and $$s(\text{core } \mathbf{46})=(2|x_1,\ x_2,\ x_3,\ x_4,\ x_5) \qquad (14)$$

These setting functions are the same as those for the embodiment of Fig. 2. An output path through a winding 55 on core 45 or 46 is therefore provided for each possible information message except the plausible message. Only in the latter case are both output paths to circuit 50 blocked.

The output path including the output windings 55 on cores 47 and 48 is to be blocked except when a plausible code is being checked. Therefore one or other of the cores 47 and 48 must be set for each combination of input variables except the plausible ones. Core 47 will therefore be set for less than two information bits being present in the coded message and core 48 for more than two information bits; these are the same setting functions as for the cores 10 and 11 of the embodiment of Fig. 1. However, because of the different circuitry employed, an output pulse to work circuit 51 is indicative of a plausible coded message, while an output pulse in the embodiment of Fig. 1 was indicative of an implausible coded message.

For the more general case of checking any $a$-out-of-$b$ code, the input composites for the cores of a circuit in accordance with Fig. 1 can easily be seen to be $$Nx'_1+Nx'_2+\ \ldots\ Nx'_a-Nx_{a+1}\ \ldots\ -Nx_b \qquad (15)$$

and $$Nx_1+Nx_2\ .\ .\ .\ Nx_{b-a}-Nx'_{b-a+1}\ .\ .\ .\ -Nx_b \quad (16)$$

and the input composites for the cores of a circuit in accordance with Fig. 2 to be $$Nx'_1+Nx'_2\ .\ .\ .\ +Nx'_{a+1} -Nx_{a+2}\ .\ .\ .\ -Nx_b \quad (17)$$

and $$Nx_1+Nx_2\ .\ .\ .\ +Nx_{b-a+1} -Nx'_{b-a+2}\ .\ .\ .\ Nx'_b \quad (18)$$

In circuits in accordance with this invention, wherein as described above there is a balancing of the magnetomotive force tending to set the core and that tending to maintain the core in its initial state of magnetization, the possible deviations of the input current from the desired value becomes of import and must be considered. This current variation will depend on the source of the input pulses and the degree to which the input current can be kept to a close tolerance. If we assume that the specified current pulse to be applied to all input windings is I and $\delta$ the fractional deviation from this value that will be tolerated in the system, the range of currents that may be applied to the input windings is $$(1-\delta)I \leqq I \leqq (1+\delta)I$$

where $0<\delta<<1$.

As the input composites operate by means of this balance between pulses occurring in the positively and negatively connected windings, the two critical cases arise when an equal number of positive and negative windings are pulsed, so that a balance is attained and no core should be switched, and when a maximum number of the windings have current through them in such a combination that one more winding is pulsed to set the core than to oppose setting the core. To attain the required operating margins the number of turns of the windings that set the core are advantageously not the same as the number of turns of the windings that oppose setting the core for reasons further brought out herein; the former we shall define as $N_p$ and the latter as $N_n$. Further we shall define the expression $(ni)_0$ as the minimum magnetomotive force that significantly affects the direction of magnetization of the core.

The most critical case for a "0" setting function would be when some of the positive windings have the maximum current through them and an equal number of the negative windings the minimum current through them, in which case to prevent erroneous operation of the core $$N_pI(1+\delta)-N_nI(1-\delta) \leqq (ni)_0 \quad (19)$$

If we assume $(ni)_0=0$, thus allowing no positive magnetomotive force, Equation 19 gives $$N_n \geq \frac{1+\delta}{1-\delta}N_p \quad (20)$$

The most critical case for the core being set occurs when a maximum number of windings are pulsed so that the number of positively connected windings pulsed is one greater than the number of negatively connected windings pulsed, the positive windings receiving minimum current and the negative windings receiving maximum current. This maximum number of positively connected windings we shall call $\lambda$; it can be seen that $$\lambda=k, \text{ if } k-1<n/2, \quad (21a)$$

and $$\lambda=n-k+1, \text{ if } k-1 \geqq n/2 \quad (21b)$$

The inequality to be satisfied in this case is $$\lambda N_p(1-\delta)I-(\lambda-1)N_n(1+\delta)I \geqq NI \quad (22)$$

or $$\lambda(1-\delta)N_p-(\lambda-1)(1+\delta)N_n \geqq N \quad (23)$$

where NI is the number of ampere-turns, or the magnetomotive force, necessary to switch the core in the allotted time. Eliminating $N_n$ by assuming the equality in (20) gives $$\frac{\lambda(1-\delta)^2-(\lambda-1)(1+\delta)^2}{1-\delta}N_p \geq N \quad (24)$$

which reduces to $$\frac{(1+\delta)^2-4\lambda\delta}{1-\delta}N_p \geq N \quad (25)$$

$N_p$ and N are both positive numbers; hence this inequality has allowable solutions for $N_p$ if and only if $$(1+\delta)^2>4\lambda\delta \quad (26)$$

When this condition is fulfilled, we may set $$N_p=\frac{1-\delta}{(1+\delta)^2-4\lambda\delta}N \quad (27)$$

and $$N_n=\frac{1+\delta}{1-\delta}N_p=\frac{1+\delta}{(1+\delta)^2-4\lambda\delta}N \quad (28)$$

The table below gives $N_p$, $N_n$ for all allowable values of $\lambda$ when $\delta$ takes on the values, 0.05, 0.10, 0.15, 0.20. It should be remembered that the numbers of turns would be reduced somewhat if the assumption $(ni)_0=0$, made in deriving Equation 19, were modified to, say, $$(ni)_0=0.3\ NI$$

| $\delta$ | $\lambda$ | $N_p/N$ | $N_n/N$ |
|---|---|---|---|
| 0.05 | 1 | 1.05 | 1.16 |
| | 2 | 1.35 | 1.50 |
| | 3 | 1.89 | 2.09 |
| | 4 | 3.14 | 3.48 |
| | 5 | 9.27 | 10.25 |
| 0.10 | 1 | 1.11 | 1.36 |
| | 2 | 2.19 | 2.68 |
| | 3 | 90.0 | 110.0 |
| 0.15 | 1 | 1.13 | 1.59 |
| | 2 | 6.94 | 9.39 |
| 0.20 | 1 | 1.25 | 1.88 |

The values given in the table are merely lower limits for $N_p$, $N_n$, and suffice only to show the possible values of $\lambda$ for a given $\delta$. In practice, $N_p$ and $N_n$ must be integers, though N need not be as only the value NI is important, so it is necessary to find the smallest integral solutions of the simultaneous inequalities (19) and (22).

From the above discussion one can determine the margins and limits required to attain operation of the magnetic core circuits in accordance with this invention and particularly can ascertain the number of turns of the positively and negatively connected windings, in relation to the hypothetical number of turns required to switch the core for the current pulse to be employed.

It is to be understood that the above-described arrangements are illustrative of the application of the principles of the invention. Numerous other arrangements may be devised by those skilled in the art without departing from the spirit and scope of the invention.

What is claimed is:

1. A circuit for determining the plausibility of coded information messages comprising a pair of magnetic cores each having input windings, an activating winding, and an output winding thereon, means for applying input pulses to said input windings of one of said cores, said input pulses and windings of said one core being arranged so that certain of said pulses tend to set said one core and other of said pulses tend to oppose setting of said one core and said one core is set whenever less than the plausible number of information bits are present in the coded message, means for applying input pulses to said input windings of the other of said cores, said input pulses and windings of said other core being arranged so that certain of said pulses tend to set said other core and other of said pulses tend to oppose setting of said other core and said other core is set whenever more than the plausible number of information bits are present in the coded message, means for subsequently applying an activating pulse to said activating windings, and means including said output windings for receiving an output indication depending on the magnetic condition of said cores after application of said pulses to said input windings.

2. A circuit in accordance with claim 1 wherein the message to be checked is an $a$-out-of-$b$ code, there are $b$ input windings on each core, the input composite of said one core is $$N_p x'_1 + N_p x'_2 + \ldots N_p x'_a - N_n x_{a+1} \ldots - N_n x_b$$

and the input composite of other core is $$N_p x_1 + N_p x_2 \ldots + N_p x_{b-a} - N_n x'_{b-a+1} \ldots - N_n x'_b$$

$N_p$ being the number of turns of the positively connected input windings and $N_n$ the number of turns of the negatively connected input windings.

3. A circuit in accordance with claim 2 wherein the message to be checked is in a two-out-of-five code and the input composite of said one core is $$N_p x'_1 + N_p x'_2 - N_n x_3 - N_n x_4 - N_n x_5$$

and the input composite of said other core is $$N_p x_1 + N_p x_2 + N_p x_3 - N_n x'_4 - N_n x'_5$$

4. A circuit in accordance with claim 1 wherein said one core is set whenever not more than the plausible number of information bits are present in the coded message and said other core is set whenever not less than the plausible number of information bits are present in the coded message.

5. A circuit in accordance with claim 4 wherein the message to be checked is in an $a$-out-of-$b$ code, there are $b$ input windings on each code, the input composite of said one core is $$N_p x'_1 + N_p x'_2 + \ldots + N_p x'_{a+1} - N_n x_{a+2} \ldots - N_n x_b$$

and the input composite of said other core is $$N_p x_1 + N_p x_2 \ldots + N_p x_{b-a+1} - N_n x'_{b-a+2} \ldots - N_n x_b$$

$N_p$ being the number.

6. A circuit in accordance with claim 5 wherein the message to be checked is in a two-out-of-five code, the input composite of said one core is $$N_p x'_1 + N_p x'_2 + N_p x'_3 - N_n x_4 - N_n x_5$$

and the input composite of said other core is $$N_p x_1 + N_p x_2 + N_p x_3 + N_p x_4 - N_n x'_5$$

7. An electrical circuit comprising a magnetic core having an initial state of magnetization and requiring NI ampere-turns to switch the state of magetization, said core having $n$ input windings, an activating winding, and an output winding, means for generating $n$ input pulses each of an amplitude from $(1-\delta)I$ to $(1+\delta)I$, where $0<\delta\ll 1$, and each corresponding to one of two values of a distinct one of $n$ input variables, means for applying certain of said $n$ input pulses to said $n$ input windings, $n-k+1$ of said input windings being wound on said core to reverse the direction of magnetization on application of pulses thereto and $k-1$ of said input windings being wound on said core to maintain the initial direction of magnetization on application thereto of pulses, $k$ being any integer from 2 to $n$, the number of turns of said $n-k+1$ windings and of said $k-1$ windings being each related to N so that on application of pulses of the most extreme amplitudes to said windings the magnetomotive force will be not greater than a predetermined maximum if the direction of magnetization in the core is not to be reversed and not less than a predetermined minimum if the direction of magnetization in the core is to be reversed, and means for subsequently applying an activating pulse to said activating winding to restore the initial direction of magnetization in said core.

8. An electrical logic circuit for applying an output pulse to a load circuit on the occurrence of specific numbers of pulses on $n$ input leads where $n$ is any number greater than 2 comprising a plurality of magnetic cores, each of said cores having $n$ input windings, an activating winding, and an output winding, means for simultaneously applying input pulses to each of said $n$ windings on each of said cores, said pulses and said $n$ input windings on each core being arranged so that certain of said pulses tend to set said core and other of said pulses tend to oppose setting of said core, the number of said pulses tending to set and oppose setting being different for each core, means for subsequently applying an activating pulse to said activating windings, and means including said output windings and a load circuit for receiving an output indication depending on the magnetic condition of said cores after application of said pulses to said input windings.

9. An electrical logic circuit for applying an output pulse to a load circuit on the occurrence of $k$ or more pulses on $n$ input leads regardless of the specific ones of said leads on which said pulses occur, where $n$ is greater than 2 and $k$ is greater than 1 and less than $n$ comprising a magnetic core having $n$ input windings, an activating winding, and an output winding, means for simultaneously applying pulses to said input windings, $n-k+1$ of said input windings being wound on said core to set said core on application of pulses thereto and $k-1$ of said input windings being wound on said core to oppose setting of said core on application of pulses thereto, means for subsequently applying an activating pulse to said activating winding to reset said core, and load means connected to said output winding, said load means having an output pulse applied dependent on whether there is a preponderance of pulses applied to said input windings tending to set said core over said pulses applied to said input windings tending to oppose setting of said core.

References Cited in the file of this patent

UNITED STATES PATENTS 2,609,433 Goff ---------------- Sept. 2, 1952

OTHER REFERENCES

Progress Report No. BL-3 of the Harvard Univ. Computation Laboratory: "The Use of Magnetic Cores as Switching Devices," by Minnick, April 1953.